(12) United States Patent
Zhuang et al.

(10) Patent No.: US 10,057,159 B2
(45) Date of Patent: Aug. 21, 2018

(54) ROUTE ADVERTISEMENT METHOD, SYSTEM AND CONTROLLER

(71) Applicant: Huawei Technologies Co., Ltd., Shenzhen (CN)

(72) Inventors: Shunwan Zhuang, Beijing (CN); Chang Wang, Beijing (CN); Yuanbin Ouyang, Beijing (CN); Fengqing Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 15/010,834

(22) Filed: Jan. 29, 2016

(65) Prior Publication Data
US 2016/0149803 A1 May 26, 2016

Related U.S. Application Data

(63) Continuation of application No. PCT/CN2013/080471, filed on Jul. 31, 2013.

(51) Int. Cl.
*H04L 12/707* (2013.01)
*H04L 12/64* (2006.01)
(Continued)

(52) U.S. Cl.
CPC .......... *H04L 45/22* (2013.01); *H04L 12/6418* (2013.01); *H04L 45/02* (2013.01); *H04L 47/122* (2013.01)

(58) Field of Classification Search
CPC ............................ H04B 7/2121; H04B 7/2123; H04B 7/18528; H04B 7/18571; H04B 7/18576;
(Continued)

(56) References Cited

U.S. PATENT DOCUMENTS

2006/0168279 A1* 7/2006 Lee ..................... H04L 12/4641
709/230
2008/0101385 A1 5/2008 Elias et al.
(Continued)

FOREIGN PATENT DOCUMENTS

CN 1893419 A 1/2007
CN 103152267 A 6/2013
(Continued)

OTHER PUBLICATIONS

Bates, T. et al., "BGP Route Reflection: An Alternative to Full Mesh Internal BGP (IBGP)," Network Working Group, Standards Track, Apr. 2006, 12 pages.
(Continued)

*Primary Examiner* — Dady Chery
(74) *Attorney, Agent, or Firm* — Slater Matsil, LLP

(57) ABSTRACT

Embodiments of the present invention provide a route advertisement method, and controller, where the method is applied to a BGP-based routing network, a physical controller in the routing network is connected to multiple physical routers, and the method includes: receiving, by the physical controller, routing information reported by at least one physical router; obtaining a traffic path in which the at least one physical router is used as an egress router to transmit traffic to a destination router; generating a route for a physical router in the traffic path; and delivering the generated route to a corresponding physical router. In these embodiments, it is avoided that congestion occurs at an egress router, and a router that receives the traffic may generate a route for the router according to the traffic path so as to transmit the traffic to a next-hop router of the router without a need of recalculation.

16 Claims, 6 Drawing Sheets

(51) Int. Cl.
*H04L 12/751* (2013.01)
*H04L 12/803* (2013.01)

(58) Field of Classification Search
CPC ...... H04J 2203/0069; H04Q 2213/394; H04W 72/04; H04W 72/12; H04W 76/00; H04W 84/06; H04L 47/10; H04L 47/12; H04L 47/20; H04L 47/24
USPC ............... 370/230, 236, 237, 391, 392, 389, 370/395.31; 709/200, 223, 227, 239, 241, 709/424
See application file for complete search history.

(56) References Cited

U.S. PATENT DOCUMENTS

| | | | |
|---|---|---|---|
| 2008/0101392 A1 | 5/2008 | Zhang et al. | |
| 2008/0170573 A1 | 7/2008 | Ould-Brahim | |
| 2008/0267187 A1* | 10/2008 | Kulmala | H04L 12/4641 370/392 |
| 2011/0310864 A1 | 12/2011 | Gage | |
| 2015/0341259 A1 | 11/2015 | Li et al. | |

FOREIGN PATENT DOCUMENTS

| | | |
|---|---|---|
| EP | 2002610 B1 | 11/2010 |
| EP | 2245792 B1 | 8/2011 |

OTHER PUBLICATIONS

Lougheed, K. et al., A Border Gateway Protocol 3 (BGP-3), Network Working Group, Oct. 1991, 35 pages.
Lougheed, K. et al., "A Border Gateway Protocol (BGP)," Network Working Group, Jun. 1990, 29 pages.
Lougheed, K. et al., "A Border Gateway Protocol (BGP)," Network Working Group, Jun. 1989, 17 pages.
Rekhter, Y. et al., "A Border Gateway Protocol 4 (BGP-4)," Network Working Group, Stancards Track, Jan. 2006, 104 pages.
Scudder, J. et al., "Capabilities Advertisement with BGP-4," Network Working Group, Standards Track, Feb. 2009, 7 pages.
Walton, D. et al., "Advertisement of Multiple Paths in BGP, " Network Working Group, Standars Track, Expiration Date: Dec. 18, 2012, Jun. 17, 2012, 9 pages.

* cited by examiner

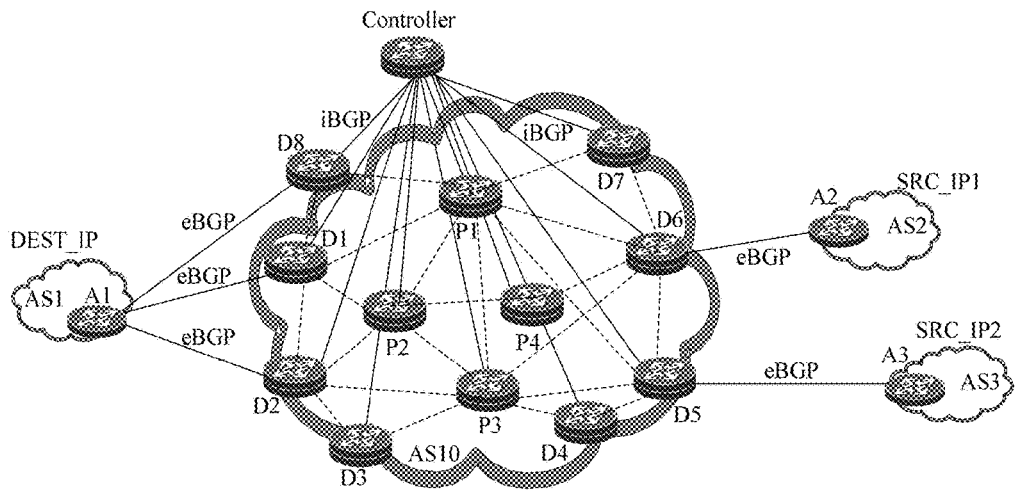

FIG. 1A

A physical controller receives routing information reported by at least one physical router of multiple physical routers connected to the physical controller, where the routing information includes a destination address of a destination router connected to the at least one physical router — 101

The physical controller obtains a traffic path in which the at least one physical router is used as an egress router to transmit traffic to the destination router — 102

The physical controller generates a route for the physical router in the traffic path — 103

The physical controller delivers the generated route to a corresponding physical router — 104

FIG. 1B

ROUTE ADVERTISEMENT METHOD, SYSTEM AND CONTROLLER

This application is a continuation of International Application No. PCT/CN2013/080471, filed on Jul. 31, 2013, which is hereby incorporated by reference in its entirety.

TECHNICAL FIELD

The present invention relates to the field of network communications technologies, and in particular, to a route advertisement method, a system, and a controller.

BACKGROUND

An autonomous system (AS) generally includes multiple routers, and the routers communicate by using the Border Gateway Protocol (BGP). BGP is a dynamic routing protocol deployed within an AS and between ASs, and is primarily used to exchange routing information and construct a propagation path to prevent generation of a routing loop. A router within an AS is also referred to as a peer (Peer). To ensure connectivity between routers, a full connection needs to be established between the routers, that is, each router is connected to other routers.

However, when an AS has a large number of routers, the number of connections established between the routers is also very large accordingly, and a large quantity of network resources are consumed in establishing these connections. In the prior art, in order to reduce the number of connections between routers, a router within an AS is configured as a Route Reflector, (RR), and other routers except the RR are referred to as clients (Client). A connection is established between the RR and each client, but no connection needs to be established between clients. The RR reflects routing information between the clients. When the RR receives routes reported by multiple clients that have a same destination address and serve as egress routers, the RR selects one egress router from the multiple egress routers, and sends a route of the selected one router to every client.

In the process of researching the prior art, the inventor finds that: because the RR selects only one egress router and delivers the route of the egress router to all clients, when any client receives traffic that is transmitted to a router corresponding to the destination address, the client needs to calculate a next-hop route of the client and finally route the traffic to the one egress router, which tends to cause congestion of the egress router and degrades performance of a routing network.

SUMMARY

Embodiments of the present invention provide a route advertisement method, system and controller to resolve a problem in the prior art that advertised routes are likely to cause congestion at a route egress and thereby lead to low routing performance of a network.

To resolve the foregoing technical problem, the embodiments of the present invention disclose the following technical solutions:

According to a first aspect, a route advertisement method is provided, where the method is applied to a routing network which is based on Border Gateway Protocol BGP, a physical controller in the routing network is connected to multiple physical routers, and the method includes:

receiving, by the physical controller, routing information reported by at least one physical router of the multiple physical routers, where the routing information includes a destination address of a destination router connected to the at least one physical router;

obtaining, by the physical controller, a traffic path in which the at least one physical router is used as an egress router to transmit traffic to the destination router;

generating, by the physical controller, a route for a physical router in the traffic path; and delivering, by the physical controller, the generated route to a corresponding physical router.

With reference to the first aspect, in a first possible implementation manner of the first aspect, after the receiving, by the physical controller, routing information reported by at least one physical router of the multiple physical routers, the method further includes:

creating, by the physical controller, a routing entry for the routing information, where the routing entry includes a mapping relationship between a router identifier of the at least one physical router and the destination address;

the obtaining, by the physical controller, a traffic path in which the at least one physical router is used as an egress router to transmit traffic to the destination router includes:

matching, by the physical controller, a set traffic path database according to the router identifier of the at least one physical router; and obtaining a traffic path, in which the at least one physical router is used as an egress router to transmit traffic to the destination router, from the traffic path database according to a matching result.

With reference to the first aspect or the first possible implementation manner of the first aspect, in a second possible implementation manner of the first aspect, before the receiving, by the physical controller, routing information reported by at least one physical router of the multiple physical routers, the method further includes:

generating, by the physical controller, a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the receiving, by the physical controller, routing information reported by at least one physical router of the multiple physical routers includes:

receiving, by the physical controller by using at least one logical router corresponding to the at least one physical router, the routing information reported by the at least one physical router; and reporting, by the physical controller, the routing information to the logical controller by using the at least one logical router.

With reference to the second possible implementation manner of the first aspect, in a third possible implementation manner of the first aspect, the generating, by the physical controller, a route for a physical router in the traffic path includes:

generating, by the physical controller, the route for the physical router in the traffic path by using the logical controller; and the delivering, by the physical controller, the generated route to a corresponding physical router includes:

delivering, by the physical controller by using the logical controller, the route to a logical router corresponding to the physical router in the traffic path, where the route is generated for the physical router in the traffic path; and forwarding, by the physical controller by using the logical router, the generated route to the physical router corresponding to the logical router.

With reference to the second possible implementation manner of the first aspect, in a fourth possible implementation manner of the first aspect, the generating, by the physical controller, a route for a physical router in the traffic path includes:

delivering, by the physical controller, the routing information to the multiple logical routers by using the logical controller, so that a logical router corresponding to the physical router in the traffic path generates the route for the physical router in the traffic path; and the delivering, by the physical controller, the generated route to a corresponding physical router includes:

delivering, by the physical controller, the generated route to the physical router in the traffic path by using the logical router corresponding to the physical router in the traffic path.

According to a second aspect, a route advertisement system is provided, where the system is applied to a routing network which is based on Border Gateway Protocol BGP, and the system includes a physical controller and multiple physical routers connected to the physical controller, where the physical router is configured to receive routing information reported by a destination router connected to the physical router, where the routing information includes a destination address of the destination router; and the physical controller is configured to receive routing information reported by at least one physical router of the multiple physical routers, obtain a traffic path in which the at least one physical router is used as an egress router to transmit traffic to the destination router, generate a route for a physical router in the traffic path, and deliver the generated route to a corresponding physical router.

With reference to the second aspect, in a first possible implementation manner of the second aspect, the physical controller is further configured to create a routing entry for the routing information after receiving the routing information reported by the at least one physical router of the multiple physical routers, where the routing entry includes a mapping relationship between a router identifier of the at least one physical router and the destination address; and the physical controller is specifically configured to match a set traffic path database according to the router identifier of the at least one physical router, and obtain a traffic path, in which the at least one physical router is used as an egress router to transmit traffic to the destination router, from the traffic path database according to a matching result.

With reference to the second aspect or the first possible implementation manner of the second aspect, in a second possible implementation manner of the second aspect, the physical controller is further configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the physical controller is specifically configured to receive, by using at least one logical router corresponding to the at least one physical router, the routing information reported by the at least one physical router, and report the routing information to the logical controller by using the at least one logical router.

With reference to the second possible implementation manner of the second aspect, in a third possible implementation manner of the second aspect, the physical controller is specifically configured to generate the route for the physical router in the traffic path by using the logical controller, deliver, by using the logical controller, the route to a logical router corresponding to the physical router in the traffic path, where the route is generated for the physical router in the traffic path, and forward, by using the logical router, the generated route to the physical router corresponding to the logical router.

With reference to the second possible implementation manner of the second aspect, in a fourth possible implementation manner of the second aspect, the physical controller is specifically configured to deliver the routing information to the multiple logical routers by using the logical controller, so that a logical router corresponding to the physical router in the traffic path generates the route for the physical router in the traffic path; and deliver the generated route to the physical router in the traffic path by using the logical router corresponding to the physical router in the traffic path.

According to a third aspect, a controller is provided, where the controller serves as a physical controller and is applied to a routing network which is based on Border Gateway Protocol BGP, where the routing network further includes multiple physical routers connected to the physical controller, and the controller includes:

a receiving unit, configured to receive routing information reported by at least one physical router of the multiple physical routers, where the routing information includes a destination address of a destination router connected to the at least one physical router;

an obtaining unit, configured to obtain a traffic path in which the at least one physical router is used as an egress router to transmit traffic to the destination router;

a generating unit, configured to generate a route for a physical router in the traffic path obtained by the obtaining unit; and an advertising unit, configured to deliver the route generated by the generating unit to a corresponding physical router.

With reference to the third aspect, in a first possible implementation manner of the third aspect, the controller further includes:

a creating unit, configured to create a routing entry for the routing information received by the receiving unit, where the routing entry includes a mapping relationship between a router identifier of the at least one physical router and the destination address; and the obtaining unit includes:

a path matching subunit, configured to match a set traffic path database according to the router identifier of the at least one physical router; and a path obtaining subunit, configured to obtain a traffic path, in which the at least one physical router is used as an egress router to transmit traffic to the destination router, from the traffic path database according to a matching result of the path matching subunit.

With reference to the third aspect or the first possible implementation manner of the third aspect, in a second possible implementation manner of the third aspect, the controller further includes:

a logical unit, configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the receiving unit is specifically configured to receive, by using at least one logical router corresponding to the at least one physical router, the routing information reported by the at least one physical router, and report the routing information to the logical controller by using the at least one logical router.

With reference to the second possible implementation manner of the third aspect, in a third possible implementation manner of the third aspect, the generating unit is specifically configured to generate the route for the physical router in the traffic path by using the logical controller; and the advertising unit is specifically configured to: deliver, by using the logical controller, the route to a logical router corresponding to the physical router in the traffic path, where the route is generated for the physical router in the traffic path, and forward, by using the logical router, the generated route to the physical router corresponding to the logical router.

With reference to the second possible implementation manner of the third aspect, in a fourth possible implementation manner of the third aspect, the generating unit is specifically configured to deliver the routing information to the multiple logical routers by using the logical controller, so that a logical router corresponding to the physical router in the traffic path generates the route for the physical router in the traffic path; and the advertising unit is specifically configured to deliver the generated route to the physical router in the traffic path by using the logical router corresponding to the physical router in the traffic path.

According to a fourth aspect, a controller is provided, where the controller serves as a physical controller and is applied to a routing network which is based on Border Gateway Protocol BGP, where the routing network further includes multiple physical routers connected to the physical controller, and the controller includes a network interface and a processor, where the network interface is configured to receive routing information reported by at least one physical router of the multiple physical routers, where the routing information includes a destination address of a destination router connected to the at least one physical router; and the processor is configured to obtain a traffic path in which the at least one physical router is used as an egress router to transmit traffic to the destination router, generate a route for a physical router in the traffic path, and deliver the generated route to a corresponding physical router through the network interface.

With reference to the fourth aspect, in a first possible implementation manner of the fourth aspect, the processor is further configured to create a routing entry for the routing information, where the routing entry includes a mapping relationship between a router identifier of the at least one physical router and the destination address; and the processor is specifically configured to match a set traffic path database according to the router identifier of the at least one physical router, and obtain a traffic path, in which the at least one physical router is used as an egress router to transmit traffic to the destination router, from the traffic path database according to a matching result.

With reference to the fourth aspect or the first possible implementation manner of the fourth aspect, in a second possible implementation manner of the fourth aspect, the processor is further configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the processor is specifically configured to receive, by using at least one logical router corresponding to the at least one physical router, the routing information reported by the at least one physical router, and report the routing information to the logical controller by using the at least one logical router.

With reference to the second possible implementation manner of the fourth aspect, in a third possible implementation manner of the fourth aspect, the processor is specifically configured to generate the route for the physical router in the traffic path by using the logical controller, deliver, by using the logical controller, the route to a logical router corresponding to the physical router in the traffic path, where the route is generated for the physical router in the traffic path, and forward, through the network interface by using the logical router, the generated route to the physical router corresponding to the logical router.

With reference to the second possible implementation manner of the fourth aspect, in a fourth possible implementation manner of the fourth aspect, the processor is specifically configured to deliver the routing information to the multiple logical routers by using the logical controller, so that a logical router corresponding to the physical router in the traffic path generates the route for the physical router in the traffic path; and deliver the generated route to the physical router in the traffic path through the network interface by using the logical router corresponding to the physical router in the traffic path.

In the embodiments of the present invention, a physical controller in a BGP-based routing network is connected to multiple physical routers, and the physical controller receives routing information reported by at least one physical router in the multiple physical routers, obtains a traffic path in which the at least one physical router is used as an egress router to transmit traffic to the destination router, generates a route for the physical router in the traffic path, and delivers the generated route to a corresponding physical router. By applying the embodiments of the present invention, multiple traffic paths to a same destination address can be preplanned as required, where the multiple traffic paths have different egress routers, which prevents an egress router from being congested by traffic transmitted to the same destination address. In addition, the physical controller may directly generate a route for each router in a traffic path according to the traffic path, that is, generate a next-hop route for each router in the traffic path, and therefore, a router receiving the traffic may transmit the traffic to its next-hop router directly according to the route of the router without a need of recalculation, which improves performance of a routing network.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1A is a schematic diagram of a scenario of a routing network to which an embodiment of the present invention is applied;

FIG. 1B is a flowchart of an embodiment of a route advertisement method according to the present invention;

DETAILED DESCRIPTION OF ILLUSTRATIVE EMBODIMENTS

Figure 2:
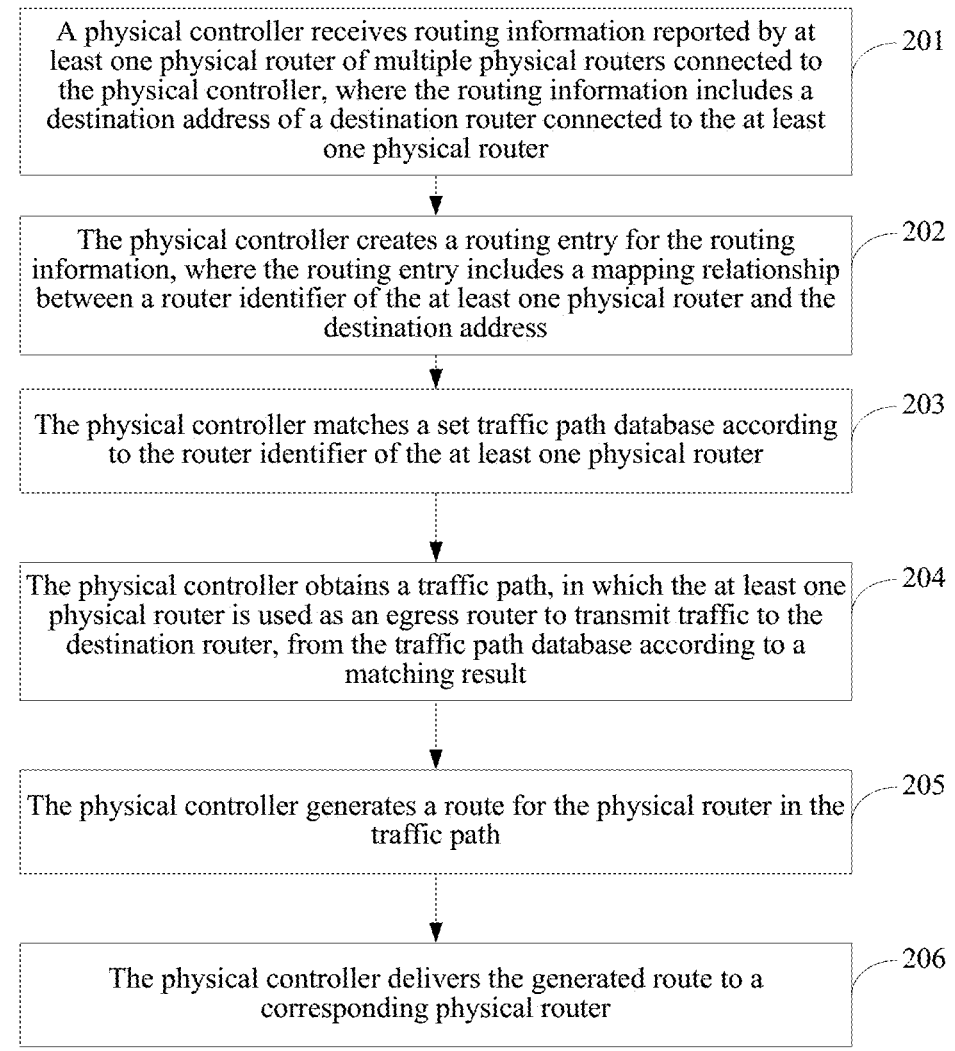
FIG. 2 is a flowchart of another embodiment of a route advertisement method according to the present invention.

To enable a person skilled in the art to better understand technical solutions in embodiments of the present invention, and make the foregoing objectives, features, and advantages of the embodiments of the present invention clearer and more comprehensible, the following describes the technical solutions of the embodiments of the present invention in more detail with reference to accompanying drawings.

Referring to FIG. 1A, FIG. 1A is a schematic diagram of a scenario of a routing network to which an embodiment of the present invention is applied.

The routing network in FIG. 1A is a BGP-based routing network having four ASs: AS1, AS10, AS2, and AS3. The AS10 includes a controller and multiple routers connected to the controller by using internal BGP (internal BGP, iBGP), and the routers include D1, D2, D3, D4, D5, D6, D7, D8, P1, P2, P3, and P4. The routers may be not directly connected to each other. A dotted line between routers in FIG. 1A only indicates that traffic can be transmitted between the routers according to a routing relationship. The AS1 includes a router A1, the AS2 includes a router A2, and the AS3 includes a router A3. The A1 is connected to edge routers D8, D1, and D2 in the AS10 by using external BGP (eBGP), the A2 is connected to an edge router D6 in the AS10 by using eBGP, and the A3 is connected to an edge router D5 in the AS10 by using eBGP. The controller and the routers shown in FIG. 1A are all physical devices; therefore, they may also be referred to as a physical controller and physical routers in the embodiments of the present invention.

Referring to FIG. 1B, FIG. 1B is a flowchart of an embodiment of a route advertisement method according to the present invention, and the method includes:

Step 101: A physical controller receives routing information reported by at least one physical router of multiple physical routers connected to the physical controller, where the routing information includes a destination address of a destination router connected to the at least one physical router.

In this embodiment, when a destination router needs to advertise routing information, the destination router transmits the routing information that includes a destination address to at least one physical router connected to the destination router in a routing network, where the at least one physical router is an edge router of the routing network. After receiving the routing information advertised by the destination router, the at least one physical router reports the routing information to the physical controller.

Step 102: The physical controller obtains a traffic path in which the at least one physical router is used as an egress router to transmit traffic to the destination router.

After receiving the routing information reported by the at least one physical router, the physical controller may create a routing entry for the routing information. The routing entry includes a mapping relationship between a router identifier of the at least one physical router and the destination address of the destination router. The physical controller may match a preset traffic path database according to the router identifier of the at least one physical router, where the traffic path database may include multiple preplanned traffic paths. Each traffic path includes physical routers in a routing network passed by the traffic transmitted between a source router and the destination router, and a direction of transmission between the physical routers. The physical controller can obtain a traffic path, in which the at least one physical router is used as an egress router to transmit traffic to the destination router, from the traffic path database according to a matching result.

Step 103: The physical controller generates a route for the physical router in the traffic path.

In this embodiment, because each traffic path includes physical routers in the routing network passed by the traffic transmitted between the source router and the destination router, and the direction of transmission between the physical routers, the physical controller generates a route for each router in the transmission path, where the route identifies a next-hop router of each of the routers.

Step 104: The physical controller delivers the generated route to a corresponding physical router.

It can be seen from the foregoing embodiment that, in the embodiment, multiple traffic paths to a same destination address can be preplanned as required, where the multiple traffic paths have different egress routers, which prevents an egress router from being congested by traffic transmitted to the same destination address. In addition, the physical controller may directly generate a route for each router in a traffic path according to the traffic path, that is, generate a next-hop route for each router in the traffic path, and therefore, a router receiving the traffic may transmit the traffic to its next-hop router directly according to the route of the router without a need of recalculation, which improves performance of a routing network.

Referring to FIG. 2, FIG. 2 is a flowchart of another embodiment of a route advertisement method according to the present invention. This embodiment is described with reference to a network architecture shown in FIG. 1A.

Step 201: A physical controller receives routing information reported by at least one physical router of multiple physical routers connected to the physical controller, where the routing information includes a destination address of a destination router connected to the at least one physical router.

In this embodiment, when a destination router needs to advertise routing information, the destination router transmits the routing information that includes a destination address to at least one physical router connected to the destination router in a routing network, where the at least one physical router is an edge router of the routing network.

After receiving the routing information advertised by the destination router, the at least one physical router reports the routing information to the physical controller.

With reference to FIG. 1A, when traffic needs to be transmitted to a router A1 in an AS1, the router A1 serves as a destination router and an address of the router A1 serves as a destination address, where the destination address generally refers to an Internet Protocol (IP) address. When the router A1 advertises its address, routing information that includes the address may be sent to three routers D8, D1, and D2, which are connected by using eBGP. As shown in FIG. 1A, the address is denoted by DEST_IP. After receiving the routing information that includes the DEST_IP, the three routers D8, D1, and D2 report the routing information to the controller.

Step 202: The physical controller creates a routing entry for the routing information, where the routing entry includes a mapping relationship between a router identifier of the at least one physical router and the destination address.

After receiving the routing information reported by the at least one physical router, the physical controller may create a routing entry for the routing information, where the routing entry includes the mapping relationship between the router identifier of the at least one physical router and the destination address of the destination router. With reference to FIG. 1A, after receiving the routing information reported by the three routers D8, D1, and D2, the physical controller creates three routing entries for the routing information, as listed in Table 1 below:

TABLE 1

| Destination address | Physical router identifier |
| --- | --- |
| DEST_IP | D8 |
| DEST_IP | D1 |
| DEST_IP | D2 |

Step 203: The physical controller matches a set traffic path database according to the router identifier of the at least one physical router.

In this embodiment, the traffic path database may include multiple preplanned traffic paths, and each traffic path includes physical routers in the routing network passed by the traffic transmitted between a source router and the destination router, and a direction of transmission between the physical routers.

With reference to FIG. 1A, assuming that the traffic path database stores two preplanned traffic paths in which a router A1 is used as the destination router, a router A2 in an AS2 accesses the router A1 in the AS1 by using a traffic path: D6→P4→P2→D1, where the router A2 serves as a source router, and its source address is SRC_IP1; a router A3 in an AS3 accesses the router A1 in the AS1 by using a traffic path: D5→P3→D2, where the router A3 serves as the source router, and its source address is SRC_IP2. It can be learned from the foregoing description that, compared with the prior art, a traffic path can be preplanned in the present invention, and therefore traffic can be transmitted to the router A1 by using multiple egress routers in an AS10 that are connected to the router A1, instead of using only one egress router.

Step 204: The physical controller obtains a traffic path, in which the at least one physical router is used as an egress router to transmit traffic to the destination router, from the traffic path database according to a matching result.

With reference to FIG. 1A, when the physical controller creates a routing entry listed in Table 1, traffic paths in the traffic path database are matched according to the physical router identifiers D8, D1, and D2. It can be learned from the foregoing example that the router identifier D1 and two traffic paths corresponding to D1 are matched.

Step 205: The physical controller generates a route for the physical router in the traffic path.

For the traffic path D6→P4→P2→D1 in the foregoing example, routes generated by the physical controller for physical routers in the traffic path are listed in the Table 2 below:

TABLE 2

| Destination address | Current router identifier | Next-hop router identifier |
| --- | --- | --- |
| DEST_IP | P2 | D1 |
| DEST_IP | P4 | P2 |
| DEST_IP | D6 | P4 |

Similarly, for the traffic path D5→P3→D2 in the foregoing example, routes generated by the physical controller for physical routers in the traffic path are listed in the Table 3 below:

TABLE 3

| Destination address | Current router identifier | Next-hop router identifier |
| --- | --- | --- |
| DEST_IP | P3 | D2 |
| DEST_IP | D5 | P3 |

Step 206: The physical controller delivers the generated route to a corresponding physical router.

By using the foregoing Table 1 as an example, the physical controller delivers a route "P4" generated for a physical router D6 to the physical router D6, delivers a route "P2" generated for a physical router P4 to the physical router P4, and delivers a route "D1" generated for a physical router P2 to the physical router P2.

It can be seen from the foregoing embodiment that: in the embodiment, multiple traffic paths to a same destination address can be preplanned as required, where the multiple traffic paths have different egress routers, which prevents an egress router from being congested by traffic transmitted to the same destination address. In addition, the physical controller may directly generate a route for each router in a traffic path according to the traffic path, that is, generate a next-hop route for each router in the traffic path, and therefore, a router receiving the traffic may transmit the traffic to its next-hop router directly according to the route of the router without a need of recalculation, which improves performance of a routing network.

Figure 3A:
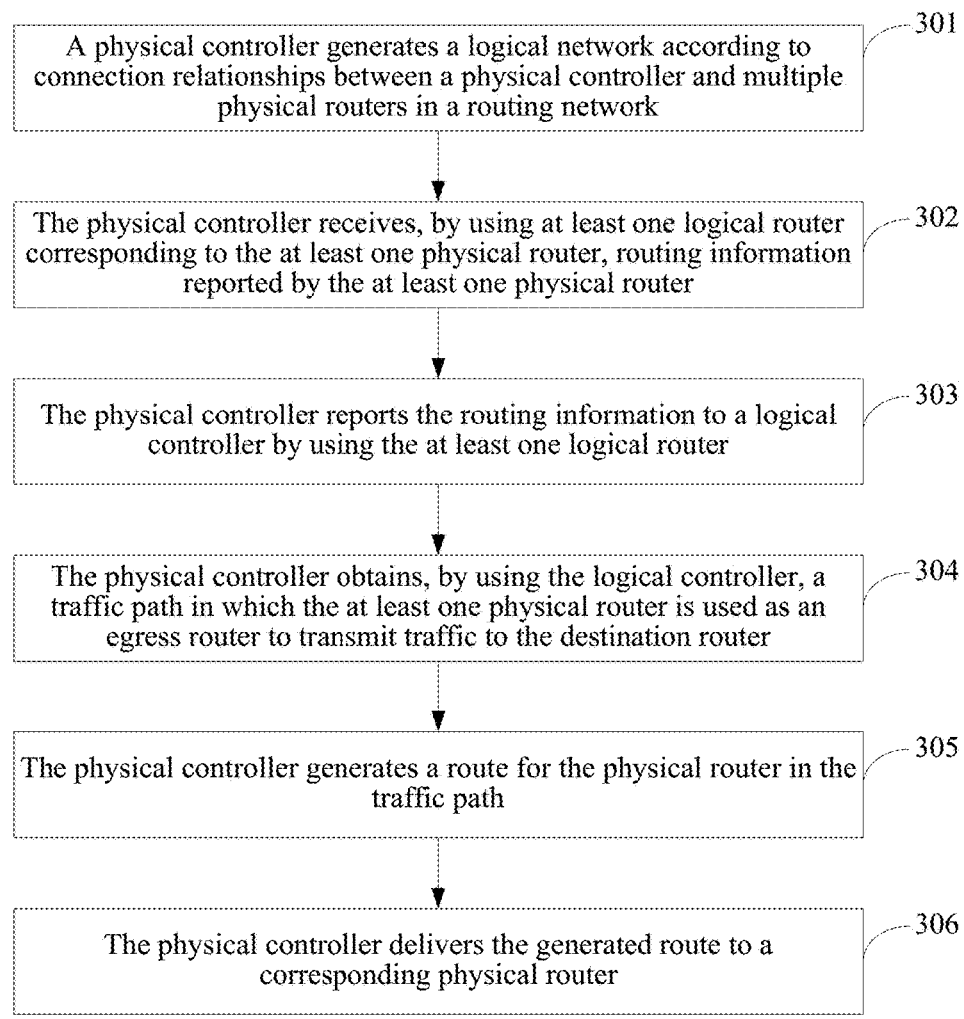
FIG. 3A is a flowchart of another embodiment of a route advertisement method according to the present invention.

Referring to FIG. 3A, FIG. 3A is a flowchart of another embodiment of a route advertisement method according to the present invention. This embodiment is described with reference to a network architecture shown in FIG. 1A.

Step 301: A physical controller generates a logical network according to connection relationships between a physical controller and multiple physical routers in a routing network.

In this embodiment, the physical controller may generate a logical network for the routing network, where each physical device in the routing network corresponds to a logical device in the logical network, that is, the logical network includes a logical controller corresponding to the physical controller, and logical routers that correspond to the physical routers in a one-to-one mapping manner; the logical controller is connected to the logical routers, and the logical controller can communicate with the logical router based on BGP or by other means, which is not limited by this embodiment of the present invention.

Figure 3B:
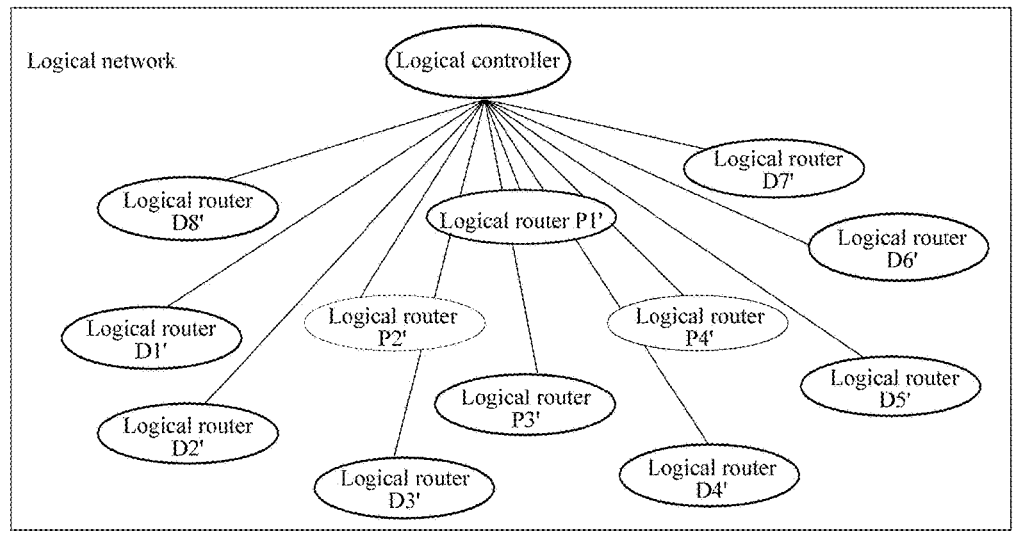
FIG. 3B is a schematic diagram of a logical network that is generated based on a routing network shown in FIG. 1A.

Referring to FIG. 3B, FIG. 3B shows a logical network that is generated based on a routing network shown in FIG. 1A. The logical network in FIG. 3B is primarily a logical network generated for an AS10, and connection relationships between the logical controller and logical routers in the logical network are shown in FIG. 3B, and are not described repeatedly herein.

Step 302: The physical controller receives, by using at least one logical router corresponding to the at least one physical router, routing information reported by the at least one physical router.

In this embodiment, when a destination router needs to advertise routing information, the destination router transmits the routing information that includes a destination address to at least one physical router connected to the destination router in a routing network, where the at least one physical router is an edge router of the routing network. In this embodiment, the physical controller creates a logical network, and therefore, after receiving the routing information, the at least one physical router may report the routing information to a corresponding logical router in the logical network, and the logical router then uploads the routing information to the logical controller.

With reference to FIG. 1A, when the router A1 advertises its address, routing information that includes the address may be sent to three routers D8, D1, and D2, which are connected by using eBGP. As shown in FIG. 1A, the address is denoted by DEST_IP. After the three routers D8, D1, and D2 receive the routing information that includes the DEST_IP, with reference to FIG. 3B, the three routers D8, D1, and D2 report the routing information to corresponding logical routers D8', D1', and D2' respectively.

Step 303: The physical controller reports the routing information to the logical controller by using the at least one logical router.

With reference to FIG. 3B, the logical routers D8', Dr, and D2' transmit the received routing information to the logical controller.

Step 304: The physical controller obtains, by using the logical controller, a traffic path, in which the at least one physical router is used as an egress router to transmit traffic to the destination router.

In this embodiment, after receiving the routing information reported by the at least one logical router, the logical controller may create a routing entry for the routing information, where the routing entry includes a mapping relationship between a router identifier of the at least one physical router and the destination address of the destination router.

The logical controller may match a preset traffic path database according to the router identifier of the at least one physical router, where the traffic path database may include multiple preplanned traffic paths. Each traffic path includes physical routers in a routing network passed by the traffic transmitted between a source router and the destination router, and a direction of transmission between the physical routers. The logical controller may obtain a traffic path, in which the at least one physical router is used as an egress router to transmit traffic to the destination router, from the traffic path database according to a matching result.

A process of obtaining a traffic path by the logical controller in this step is consistent with the example described in the foregoing step 202 and step 203 with reference to FIG. 1A, and is not detailed repeatedly herein.

Step 305: The physical controller generates a route for the physical router in the traffic path.

A first route generation manner in this step may be: the physical controller generates, by using the logical controller, a route for the physical router in the obtained traffic path. A specific generation process is consistent with the example described in the foregoing step 205 with reference to FIG. 1A, and is not repeated herein.

A second route generation manner in this step may be: the physical controller delivers the routing information to multiple logical routers by using the logical controller, so that a logical router corresponding to the physical router in the obtained traffic path generates the route for the physical router in the traffic path. For example, with reference to FIG. 1A, the logical router D6' corresponding to the physical router D6 may generate a route for the physical router D6 according to the received routing information and the planned traffic path. Assuming that the traffic path is still D6→P4→P2→D1, the route generated by the logical router D6' is "P4".

Step 306: The physical controller delivers the generated route to a corresponding physical router.

With reference to the first route generation manner in step 305, the physical controller may deliver, by using the logical controller, the route to the logical router corresponding to the physical router in the traffic path, where the route is generated for the physical router in the traffic path, and then the logical router forwards the generated route to the physical router corresponding to the logical router. With reference to FIG. 3B, for example, when the route generated by the logical controller for the physical router P4 is "P2", the route "P2" is delivered to the logical router P4', and the logical router P4' forwards the route "P2" to the physical router P4.

With reference to the second route generation manner in step 305, the physical controller may deliver the generated route to the physical router in the traffic path by using the logical router corresponding to the physical router in the traffic path. With reference to FIG. 3B, after generating the route "P2" for the physical router P4, the logical router P4' may deliver the route "P2" to the physical router P4 directly.

It can be seen from the foregoing embodiment that, in the embodiment, multiple traffic paths to a same destination address can be preplanned as required, where the multiple traffic paths have different egress routers, which prevents an egress router from being congested by traffic transmitted to the same destination address. In addition, the physical controller may directly generate a route for each router in a traffic path according to the traffic path, that is, generate a next-hop route for each router in the traffic path, and therefore, a router receiving the traffic may transmit the traffic to its next-hop router directly according to the route of the router without a need of recalculation, which improves performance of a routing network.

Corresponding to the embodiments of a route advertisement method according to the present invention, the present invention further provides embodiments of a route advertisement system and a controller.

Figure 4:
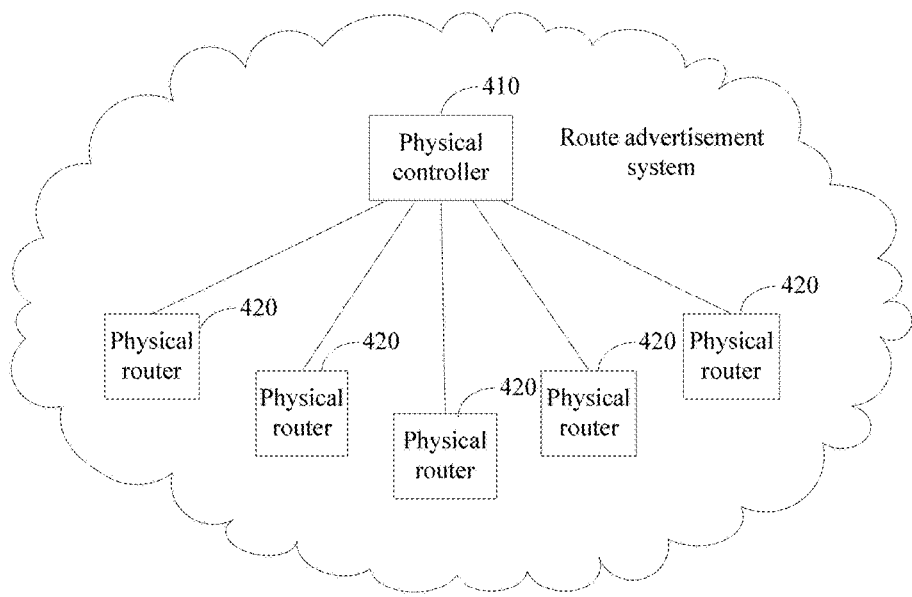
FIG. 4 is a block diagram of an embodiment of a route advertisement system according to the present invention.

Referring to FIG. 4, FIG. 4 is a block diagram of an embodiment of a route advertisement system according to the present invention.

The route advertisement system is applied to a BGP-based routing network, and includes a physical controller 410 and multiple physical routers 420 connected to the physical controller 410. For ease of illustration, FIG. 4 shows only five physical routers 420. In a practical application, the number of physical routers 420 may be set flexibly according to different routing network planning, which is not limited by the embodiment of the present invention.

The physical router 420 is configured to receive routing information reported by a destination router connected to the physical router, where the routing information includes a destination address of the destination router.

The physical controller 410 is configured to receive routing information reported by at least one physical router of the multiple physical routers 420, obtain a traffic path in which the at least one physical router is used as an egress router to transmit traffic to the destination router, generate a route for the physical router in the traffic path, and deliver the generated route to a corresponding physical router.

In an optional implementation manner:

the physical controller 410 may be further configured to create a routing entry for the routing information after receiving the routing information reported by the at least one physical router of the multiple physical routers, where the routing entry includes a mapping relationship between a router identifier of the at least one physical router and the destination address; and the physical controller 410 may be specifically configured to match a set traffic path database according to the router identifier of the at least one physical router, and obtain a traffic path, in which the at least one physical router is used as an egress router to transmit traffic to the destination router, from the traffic path database according to a matching result.

In another optional implementation manner:

the physical controller 410 may be further configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the physical controller 410 may be specifically configured to receive, by using at least one logical router corresponding to the at least one physical router, the routing information reported by the at least one physical router, and report the routing information to the logical controller by using the at least one logical router.

In another optional implementation manner:

the physical controller 410 may be specifically configured to generate the route for the physical router in the traffic path by using the logical controller, deliver, by using the logical controller, the route to the logical router corresponding to the physical router in the traffic path, where the route is generated for the physical router in the traffic path, and forward, by using the logical router, the generated route to the physical router corresponding to the logical router.

In another optional implementation manner:

the physical controller may be specifically configured to deliver the routing information to the multiple logical routers by using the logical controller, so that a logical router corresponding to the physical router in the traffic path generates the route for the physical router in the traffic path; and deliver the generated route to the physical router in the traffic path by using the logical router corresponding to the physical router in the traffic path.

Figure 5:
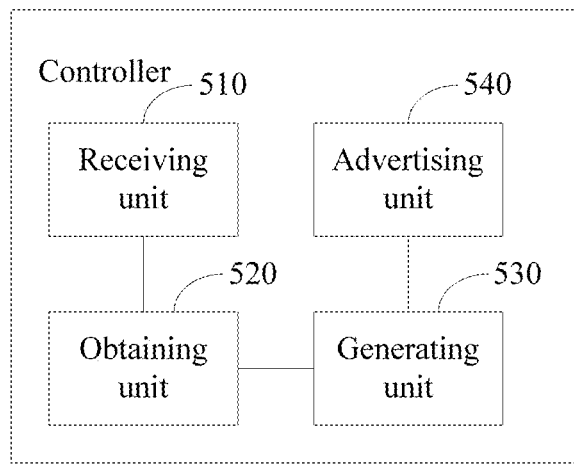
FIG. 5 is a block diagram of an embodiment of a controller according to the present invention.

Referring to FIG. 5, FIG. 5 is a block diagram of an embodiment of a controller according to the present invention, where the controller serves as a physical controller and is applied to a BGP-based routing network, where the routing network further includes multiple physical routers connected to the physical controller.

The controller includes a receiving unit 510, an obtaining unit 520, a generating unit 530, and an advertising unit 540.

The receiving unit 510 is configured to receive routing information reported by at least one physical router of the multiple physical routers, where the routing information includes a destination address of a destination router connected to the at least one physical router.

The obtaining unit 520 is configured to obtain a traffic path for transmitting traffic to the destination router by using the at least one physical router as an egress router.

The generating unit 530 is configured to generate a route for the physical router in the traffic path obtained by the obtaining unit 520.

The advertising unit 540 is configured to deliver the route generated by the generating unit 530 to a corresponding physical router.

Figure 6:
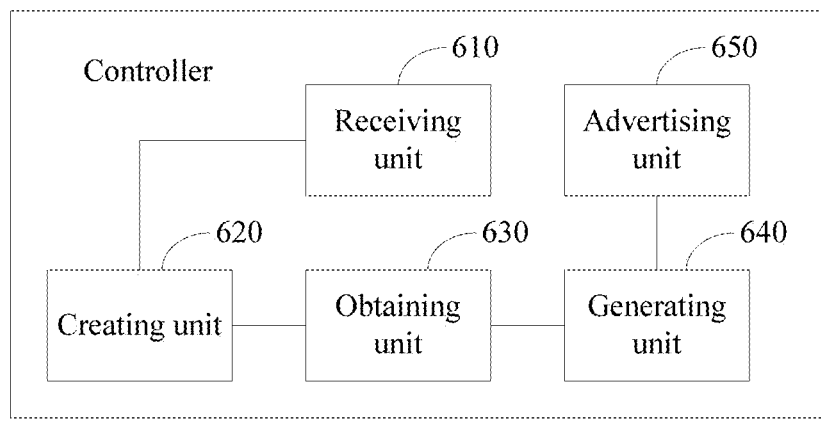
FIG. 6 is a block diagram of another embodiment of a controller according to the present invention.

Referring to FIG. 6, FIG. 6 is a block diagram of another embodiment of a controller according to the present invention, where the controller serves as a physical controller and is applied to a BGP-based routing network, where the routing network further includes multiple physical routers connected to the physical controller.

The controller includes a receiving unit 610, a creating unit 620, an obtaining unit 630, a generating unit 640, and an advertising unit 650.

The receiving unit 610 is configured to receive routing information reported by at least one physical router of the multiple physical routers, where the routing information includes a destination address of a destination router connected to the at least one physical router.

The creating unit 620 is configured to create a routing entry for the routing information received by the receiving unit 610, where the routing entry includes a mapping relationship between a router identifier of the at least one physical router and the destination address.

The obtaining unit 630 is configured to obtain a traffic path in which the at least one physical router is used as an egress router to transmit traffic to the destination router.

The generating unit 640 is configured to generate a route for the physical router in the traffic path obtained by the obtaining unit 630.

The advertising unit 650 is configured to deliver the route generated by the generating unit 640 to a corresponding physical router.

Optionally, the obtaining unit 630 may include:

a path matching subunit, configured to match a set traffic path database according to the router identifier of the at least one physical router; and a path obtaining subunit, configured to obtain a traffic path, in which the at least one physical router is used as an egress router to transmit traffic to the destination router, from the traffic path database according to a matching result of the path matching subunit.

Figure 7:
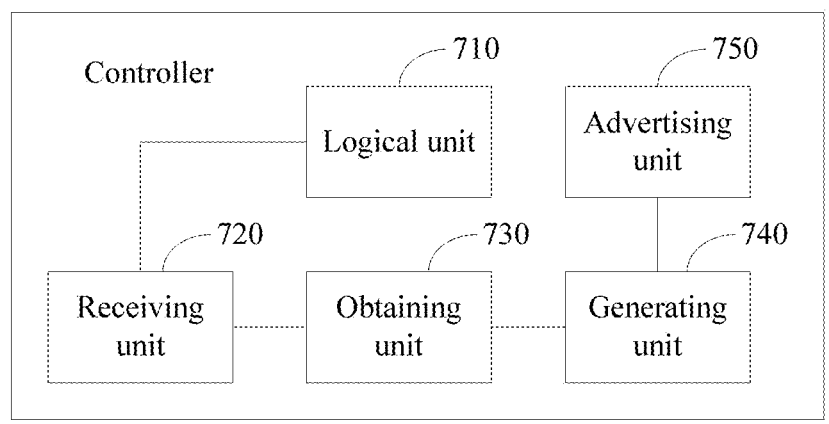
FIG. 7 is a block diagram of another embodiment of a controller according to the present invention.

Referring to FIG. 7, FIG. 7 is a block diagram of another embodiment of a controller according to the present invention, where the controller serves as a physical controller and is applied to a BGP-based routing network, where the routing network further includes multiple physical routers connected to the physical controller.

The controller includes a logical unit 710, a receiving unit 720, an obtaining unit 730, a generating unit 740, and an advertising unit 750.

The logical unit 710 is configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers.

The receiving unit 720 is configured to receive, by using at least one logical router corresponding to the at least one physical router, routing information reported by the at least one physical router, and report the routing information to the logical controller by using the at least one logical router.

The obtaining unit 730 is configured to obtain a traffic path in which the at least one physical router is used as an egress router to transmit traffic to the destination router.

The generating unit 740 is configured to generate a route for the physical router in the traffic path obtained by the obtaining unit 730.

The advertising unit 750 is configured to deliver the route generated by the generating unit 740 to a corresponding physical router.

In an optional implementation manner:

the generating unit 740 may be specifically configured to generate the route for the physical router in the traffic path by using the logical controller; and the advertising unit 750 may be specifically configured to deliver, by using the logical controller, the route to the logical router corresponding to the physical router in the traffic path, where the route is generated for the physical router in the traffic path, and forward, by using the logical router, the generated route to the physical router corresponding to the logical router.

In another optional implementation manner:

the generating unit 740 may be specifically configured to deliver the routing information to the multiple logical routers by using the logical controller, so that the logical router corresponding to the physical router in the traffic path generates the route for the physical router in the traffic path; and the advertising unit 750 may be specifically configured to deliver the generated route to the physical router in the traffic path by using the logical router corresponding to the physical router in the traffic path.

Figure 8:
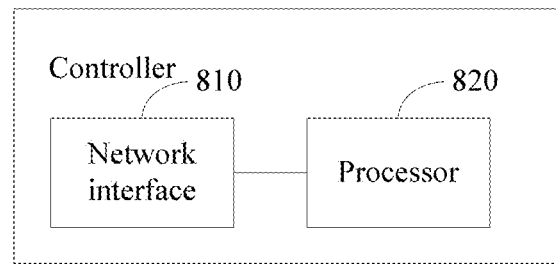
FIG. 8 is a block diagram of another embodiment of a controller according to the present invention.

Referring to FIG. 8, FIG. 8 is a block diagram of another embodiment of a controller according to the present invention, where the controller serves as a physical controller and is applied to a BGP-based routing network, where the routing network further includes multiple physical routers connected to the physical controller.

The controller includes a network interface 810 and a processor 820.

The network interface 810 is configured to receive routing information reported by at least one physical router of the multiple physical routers, where the routing information includes a destination address of a destination router connected to the at least one physical router.

The processor 820 is configured to obtain a traffic path in which the at least one physical router is used as an egress router to transmit traffic to the destination router, generate a route for the physical router in the traffic path, and deliver the generated route to a corresponding physical router through the network interface.

In an optional implementation manner:

the processor 820 may be further configured to create a routing entry for the routing information, where the routing entry includes a mapping relationship between a router identifier of the at least one physical router and the destination address; and the processor 820 may be specifically configured to match a set traffic path database according to the router identifier of the at least one physical router, and obtain a traffic path, in which the at least one physical router is used as an egress router to transmit traffic to the destination router, from the traffic path database according to a matching result.

In another optional implementation manner:

the processor 820 may be further configured to generate a logical network according to connection relationships between the physical controller and the multiple physical routers in the routing network, where a logical controller in the logical network is connected to multiple logical routers, the logical controller corresponds to the physical controller, and each of the logical routers corresponds to one of the physical routers; and the processor 820 may be specifically configured to receive, by using at least one logical router corresponding to the at least one physical router, the routing information reported by the at least one physical router, and report the routing information to the logical controller by using the at least one logical router.

In another optional implementation manner:

the processor 820 may be specifically configured to generate the route for the physical router in the traffic path by using the logical controller, deliver, by using the logical controller, the route to the logical router corresponding to the physical router in the traffic path, where the route is generated for the physical router in the traffic path, and forward, through the network interface by using the logical router, the generated route to the physical router corresponding to the logical router.

In another optional implementation manner:

the processor 820 may be specifically configured to deliver the routing information to the multiple logical routers by using the logical controller, so that a logical router corresponding to the physical router in the traffic path generates the route for the physical router in the traffic path; and deliver the generated route to the physical router in the traffic path through the network interface by using the logical router corresponding to the physical router in the traffic path.

It can be seen from the foregoing embodiment that, a physical controller in a BGP-based routing network is connected to multiple physical routers, and the physical controller receives routing information reported by at least one physical router in the multiple physical routers, obtains a traffic path in which the at least one physical router is used as an egress router to transmit traffic to the destination router, generates a route for the physical router in the traffic path, and delivers the generated route to a corresponding physical router. By applying the embodiments of the present invention, multiple traffic paths to a same destination address can be preplanned as required, where the multiple traffic paths have different egress routers, which prevents an egress router from being congested by traffic transmitted to the same destination address. In addition, the physical controller may directly generate a route for each router in a traffic path according to the traffic path, that is, generate a next-hop route for each router in the traffic path, and therefore, a router receiving the traffic may transmit the traffic to its next-hop router directly according to the route of the router without a need of recalculation, which improves performance of a routing network.

A person skilled in the art may clearly understand that the technologies in the embodiments of the present invention may be implemented by software in addition to a necessary universal hardware platform. Based on such an understanding, the technical solutions of the present invention essentially or the part contributing to the prior art may be implemented in a form of a software product. The software product is stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of the present invention.

The embodiments in this specification are all described in a progressive manner. For the same or similar part in different embodiments, reference may be made between the embodiments. Each embodiment focuses on differences from other embodiments. Particularly, for a system embodiment, because it is basically similar to the method embodiment, the system embodiment is described briefly, and the relevant part may be obtained with reference to the description of the corresponding part in the method embodiment.

The foregoing implementation manners of the present invention do not constitute any limitation on the protection scope of the present invention. Any modification, equivalent replacement, and improvement made without departing from the spirit and principle of the present invention shall fall within the protection scope of the present invention.

What is claimed is:

1. A route advertisement method comprising:
receiving, by a physical controller that is in a routing network based on Border Gateway Protocol (BGP) and that is connected to multiple physical routers, routing information reported by at least one physical router of the multiple physical routers, wherein the routing information comprises a destination address of a destination router connected to the at least one physical router;
obtaining, by the physical controller, a traffic path in which the at least one physical router is used as an egress router to transmit traffic to the destination router;
generating, by the physical controller, a route for a physical router in the traffic path; and
delivering, by the physical controller, the generated route to a corresponding physical router;
wherein the method further comprises creating, by the physical controller and after the receiving, by the physical controller, routing information reported by at least one physical router of the multiple physical routers, a routing entry for the routing information, wherein the routing entry comprises a mapping relationship between a router identifier of the at least one physical router and the destination address; and
wherein the obtaining, by the physical controller, a traffic path in which the at least one physical router is used as an egress router to transmit traffic to the destination router comprises:
matching, by the physical controller, a set traffic path database according to the router identifier of the at least one physical router; and
obtaining a traffic path, in which the at least one physical router is used as an egress router to transmit traffic to the destination router, from the traffic path database according to a matching result.

2. The method according to claim 1, wherein the method further comprises generating, by the physical controller and before the receiving, by the physical controller, the routing information reported by the at least one physical router of the multiple physical routers, a logical network according to connection relationships between the physical controller and the multiple physical routers in the routing network, wherein a logical controller in the logical network is connected to multiple logical routers, the logical controller corresponds to the physical controller, and each of the logical routers corresponds to one of the physical routers; and
wherein the receiving, by the physical controller, the routing information reported by at least one physical router of the multiple physical routers comprises:
receiving, by the physical controller by using at least one logical router corresponding to the at least one physical router, the routing information reported by the at least one physical router; and
reporting, by the physical controller, the routing information to the logical controller by using the at least one logical router.

3. The method according to claim 2, wherein the generating, by the physical controller, the route for the physical router in the traffic path comprises generating, by the physical controller, the route for the physical router in the traffic path by using the logical controller; and
wherein the delivering, by the physical controller, the generated route to a corresponding physical router comprises:
delivering, by the physical controller by using the logical controller, the route to a logical router corresponding to the physical router in the traffic path, wherein the route is generated for the physical router in the traffic path; and
forwarding, by the physical controller by using the logical router, the generated route to the physical router corresponding to the logical router.

4. The method according to claim 2, wherein the generating, by the physical controller, a route for a physical router in the traffic path comprises delivering, by the physical controller, the routing information to the multiple logical routers by using the logical controller, so that a logical router corresponding to the physical router in the traffic path generates the route for the physical router in the traffic path; and
wherein the delivering, by the physical controller, the generated route to a corresponding physical router comprises delivering, by the physical controller, the generated route to the physical router in the traffic path by using the logical router corresponding to the physical router in the traffic path.

5. A route advertisement system applied to a routing network which is based on Border Gateway Protocol (BGP), the system comprising:
a physical controller; and
multiple physical routers connected to the physical controller, wherein each of the multiple physical routers is configured to receive routing information reported by a destination router connected to the physical router, wherein the routing information comprises a destination address of the destination router;
wherein the physical controller is configured to receive the routing information reported by at least one physical router of the multiple physical routers, wherein the physical controller is further configured to obtain a traffic path in which the at least one physical router is used as an egress router to transmit traffic to the destination router, wherein the physical controller is further configured generate a route for a physical router in the traffic path, and wherein the physical controller is further configured deliver the generated route to a corresponding physical router;
wherein the physical controller is further configured to create a routing entry for the routing information after receiving the routing information reported by the at least one physical router of the multiple physical routers, and wherein the routing entry comprises a mapping relationship between a router identifier of the at least one physical router and the destination address; and wherein the physical controller is configured to match a set traffic path database according to the router identifier of the at least one physical router, and wherein the physical controller is further configured to obtain a traffic path, in which the at least one physical router is used as an egress router to transmit traffic to the destination router, from the traffic path database according to a matching result.

6. The system according to claim 5, wherein the physical controller is further configured to generate a logical network according to connection relationships between the physical controller and the multiple physical routers in the routing network, wherein a logical controller in the logical network is connected to multiple logical routers, wherein the logical controller corresponds to the physical controller, and wherein each of the logical routers corresponds to one of the physical routers; and wherein the physical controller is configured to receive, by using at least one logical router corresponding to the at least one physical router, the routing information reported by the at least one physical router, and wherein the physical controller is further configured to report the routing information to the logical controller by using the at least one logical router.

7. The system according to claim 6, wherein the physical controller is configured to:

generate the route for the physical router in the traffic path by using the logical controller;

deliver, by using the logical controller, the route to a logical router corresponding to the physical router in the traffic path, wherein the route is generated for the physical router in the traffic path; and forward, by using the logical router, the generated route to the physical router corresponding to the logical router.

8. The system according to claim 6, wherein the physical controller is specifically configured to:

deliver the routing information to the multiple logical routers by using the logical controller, so that a logical router corresponding to the physical router in the traffic path generates the route for the physical router in the traffic path; and deliver the generated route to the physical router in the traffic path by using the logical router corresponding to the physical router in the traffic path.

9. A controller, wherein the controller serves as a physical controller, the controller comprising:

a receiving unit, configured to receive routing information reported by at least one physical router of multiple physical routers connected to the physical controller and disposed in a routing network which is based on Border Gateway Protocol (BGP), wherein the routing information comprises a destination address of a destination router connected to the at least one physical router;

a processor connected to the receiving unit;

a non-transitory computer readable medium connected to the processor and having stored thereon instructions that, when executed by the processor, cause the controller to:

obtain a traffic path in which the at least one physical router is used as an egress router to transmit traffic to the destination router;

generate a route for a physical router in the obtained traffic path; and deliver the generated route generated to a corresponding physical router;

wherein the non-transitory computer readable medium further has stored thereon instructions that, when executed by the processor, cause the controller to create a routing entry for the received routing information received, wherein the routing entry comprises a mapping relationship between a router identifier of the at least one physical router and the destination address; and wherein the instructions that cause the controller to obtain a traffic path comprise instructions that, when executed by the processor, cause the controller to:

match a set traffic path database according to the router identifier of the at least one physical router; and obtain a traffic path, in which the at least one physical router is used as an egress router to transmit traffic to the destination router, from the traffic path database according to a matching result of the path matching subunit.

10. The controller according to claim 9, wherein the non-transitory computer readable medium further has stored thereon instructions that, when executed by the processor, cause the controller to generate a logical network according to connection relationships between the physical controller and the multiple physical routers in the routing network, wherein a logical controller in the logical network is connected to multiple logical routers, wherein the logical controller corresponds to the physical controller, and wherein each of the logical routers corresponds to one of the physical routers; and wherein the receiving unit is further configured to receive, by using at least one logical router corresponding to the at least one physical router, the routing information reported by the at least one physical router; and report the routing information to the logical controller by using the at least one logical router.

11. The controller according to claim 10, wherein the instructions that cause the controller to generate a route for a physical router comprise instructions that, when executed by the processor, cause the controller to generate the route for the physical router in the traffic path by using the logical controller; and wherein the instructions that cause the controller to deliver the generated route comprise instructions that, when executed by the processor, cause the controller to:

deliver, by using the logical controller, the route to a logical router corresponding to the physical router in the traffic path, wherein the route is generated for the physical router in the traffic path; and forward, by using the logical router, the generated route to the physical router corresponding to the logical router.

12. The controller according to claim 10, wherein the instructions that cause the controller to generate a route for a physical router comprise instructions that, when executed by the processor, cause the controller to deliver the routing information to the multiple logical routers by using the logical controller, so that a logical router corresponding to the physical router in the traffic path generates the route for the physical router in the traffic path; and wherein the instructions that cause the controller to generate a route for a physical router comprise instructions that, when executed by the processor, cause the controller to deliver the generated route to the physical router in the traffic path by using the logical router corresponding to the physical router in the traffic path.

13. A controller which serves as a physical controller and is applied to a routing network which is based on Border Gateway Protocol (BGP), the controller comprising:
- a network interface configured to receive routing information reported by at least one physical router of multiple physical routers in the network and connected to the physical controller, and the routing information comprises a destination address of a destination router connected to the at least one physical router;
- a processor connected to the network interface; and
- a non-transitory computer readable medium connected to the processor and having stored thereon instructions that, when executed by the processor, cause the controller to:
- obtain a traffic path in which the at least one physical router is used as an egress router to transmit traffic to the destination router;
- generate a route for a physical router in the traffic path; and
- deliver the generated route to a corresponding physical router through the network interface;
- wherein the non-transitory computer readable medium further has stored thereon instructions that, when executed by the processor, cause the controller to create a routing entry for the routing information, wherein the routing entry comprises a mapping relationship between a router identifier of the at least one physical router and the destination address;
- match a set traffic path database according to the router identifier of the at least one physical router; and
- obtain a traffic path, in which the at least one physical router is used as an egress router to transmit traffic to the destination router, from the traffic path database according to a matching result.

14. The controller according to claim 13, wherein the non-transitory computer readable medium further has stored thereon instructions that, when executed by the processor, cause the controller to:
- generate a logical network according to connection relationships between the physical controller and the multiple physical routers in the routing network, wherein a logical controller in the logical network is connected to multiple logical routers, the logical controller corresponds to the physical controller, and each of the logical routers corresponds to one of the physical routers;
- receive, by using at least one logical router corresponding to the at least one physical router, the routing information reported by the at least one physical router; and
- report the routing information to the logical controller by using the at least one logical router.

15. The controller according to claim 14, wherein the non-transitory computer readable medium further has stored thereon instructions that, when executed by the processor, cause the controller to:
- generate the route for the physical router in the traffic path by using the logical controller;
- deliver, by using the logical controller, the route to a logical router corresponding to the physical router in the traffic path, wherein the route is generated for the physical router in the traffic path; and
- forward, through the network interface by using the logical router, the generated route to the physical router corresponding to the logical router.

16. The controller according to claim 14, wherein the non-transitory computer readable medium further has stored thereon instructions that, when executed by the processor, cause the controller to:
- deliver the routing information to the multiple logical routers by using the logical controller, so that a logical router corresponding to the physical router in the traffic path generates the route for the physical router in the traffic path; and
- deliver the generated route to the physical router in the traffic path through the network interface by using the logical router corresponding to the physical router in the traffic path.

* * * * *